Jan. 8, 1952 W. A. SEBRING 2,582,074
CANDY FORMING AND DISPENSING MACHINE
Filed Aug. 23, 1948 3 Sheets-Sheet 1
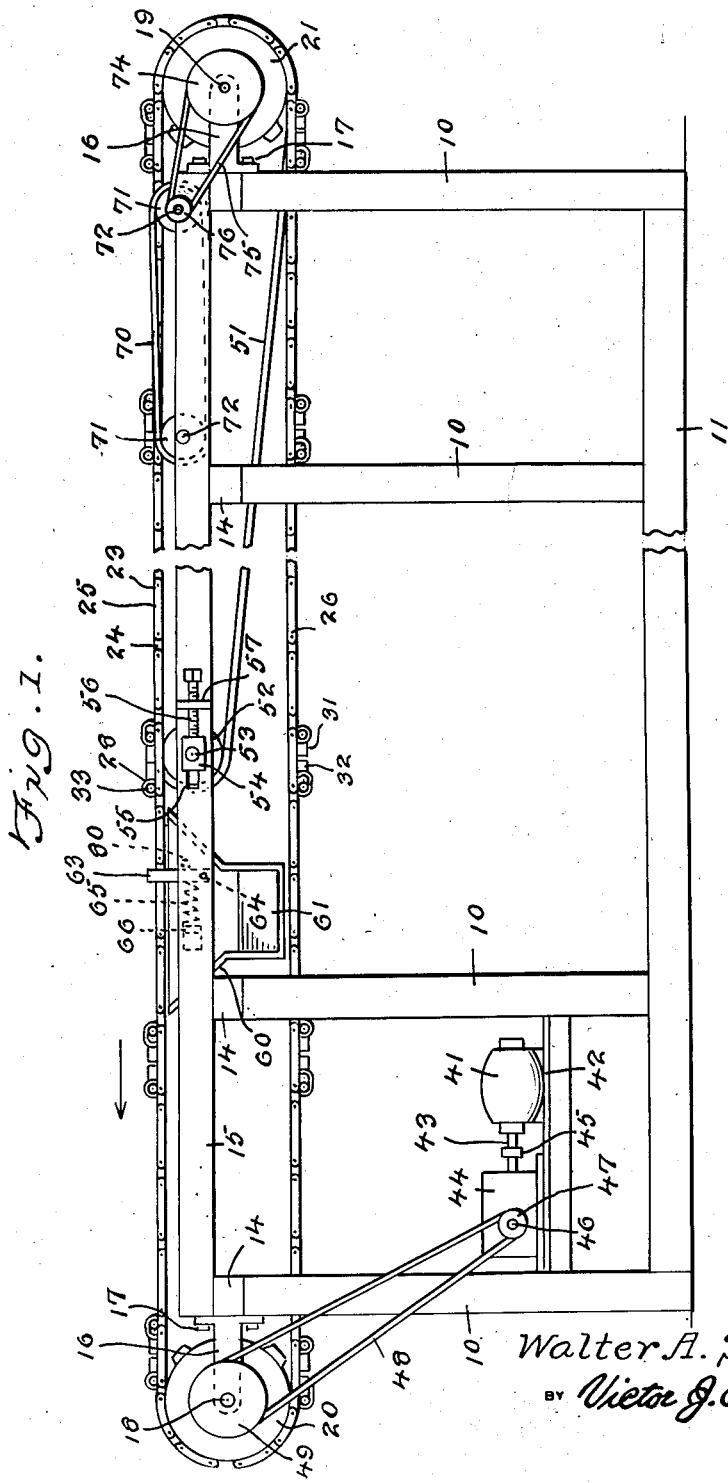
INVENTOR.
Walter A. Sebring
BY Victor J. Evans & Co.
ATTORNEYS Jan. 8, 1952 W. A. SEBRING 2,582,074
CANDY FORMING AND DISPENSING MACHINE
Filed Aug. 23, 1948 3 Sheets-Sheet 2
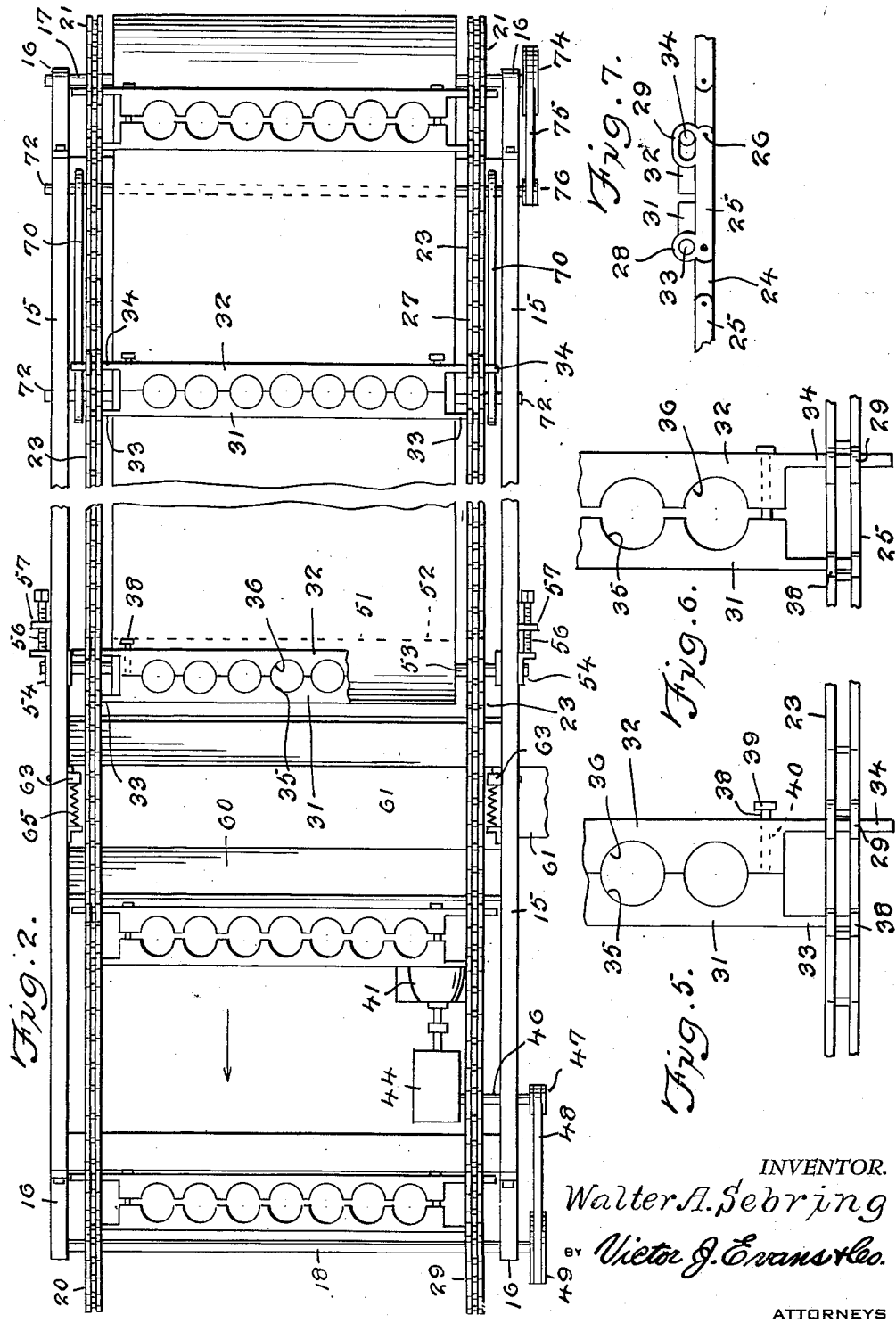
INVENTOR.
Walter A. Sebring
BY Victor J. Evans & Co.
ATTORNEYS Jan. 8, 1952  W. A. SEBRING  2,582,074
CANDY FORMING AND DISPENSING MACHINE
Filed Aug. 23, 1948  3 Sheets-Sheet 3
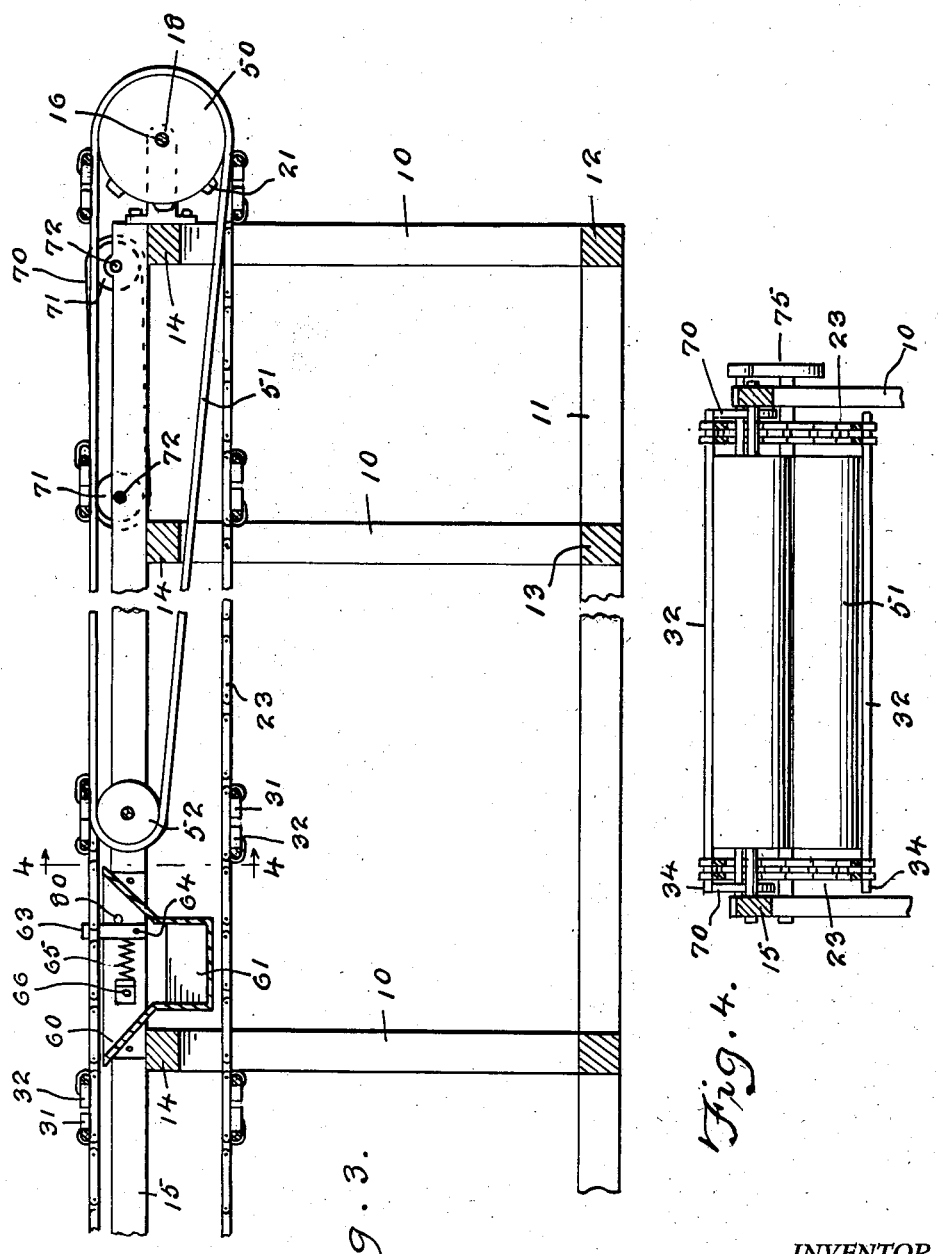
INVENTOR.
Walter A. Sebring
BY Victor J. Evans & Co.
ATTORNEYS Patented Jan. 8, 1952

2,582,074

UNITED STATES PATENT OFFICE 2,582,074

CANDY FORMING AND DISPENSING MACHINE

Walter A. Sebring, Tyler, Tex.

Application August 23, 1948, Serial No. 45,613

6 Claims. (Cl. 107—8)

The present invention relates to confectionery apparatus, and more particularly to candy molding and forming machinery.

The primary object of the invention is to provide a candy molding and making machine which is automatic in operation and eliminates manual handling of the candy or other confectionery.

Another object is to provide a confectionery machine which is adapted to mold and form different kinds of candy into various sizes and shapes without necessitating manual handling of the forming dies to remove the candy after the same has been formed or molded to the desired shape and size.

Another object is to provide a confectionery machine in which the molding dies are automatically opened and closed to facilitate the removal of the candy therefrom after the same has formed and become hardened.

Another object is to provide a confectionery machine for molding candy and the like to the desired size and shape in which the automatically controlled separable mold sections are automatically moved together after being separated for the discharge of the preformed candy, so that they can be again filled after said discharge operation.

Another object of the invention is to provide a continuous candy forming and molding machine which will automatically discharge the preformed candy into a suitable hopper without necessitating cessation of operation of the molding and forming machine.

Another object is to provide a confectionery machine which is efficient and sanitary in operation, and eliminates manual contact with the candy or confectionery during its forming and molding operation.

Another object is to provide a confectionery machine for molding and forming candy in which the bottom wall of the separable mold dies is formed by a movable endless apron arranged to travel at the same speed as the mold dies and to move away from said mold dies during a portion of the complete cyclic travel of the mold dies.

Other objects and advantages of the invention will become apparent during the course of the following description of the accompanying drawings wherein:

Figure 1 is a side elevational view of the candy making machine embodying the present invention, showing the arrangement of the candy mold members supported on the endless conveyor chains.

Figure 2 is a top elevational view of the confectionery machine showing the forming dies or molds extending transversely of and connected to, a pair of side flexible conveyor elements which travel at the same speed as an endless apron arranged beneath the dies or molds during their travel through the upper course thereof.

Figure 3 is a fragmentary longitudinal cross sectional view of the confectionery machine showing the manner in which the endless apron is arranged beneath the separable dies or mold members during their upper course of travel adjacent one end of the machine.

Figure 4 is a vertical fragmentary cross sectional view taken on line 4—4 of Figure 3, and looking in the direction of the arrows to illustrate the manner in which the endless apron is mounted beneath the separable die or mold members to form a bottom wall therefor during a portion of their endless travel.

Figure 5 is a fragmentary top elevational view showing the manner in which the dies or molds are connected adjacent their ends to the endless conveyor elements with the separable die or mold members in a closed position.

Figure 6 is a fragmentary top elevational view similar to Figure 5, but showing the die or mold members separated for discharge of the candy from the complementary mold recesses thereof, and Figure 7 is a fragmentary side elevational view showing the pin and slot connection between one section of the separable die or mold members and the endless conveyor elements.

In the drawings, and more in detail, there is shown a continuous confection making machine including a supporting frame structure comprising a series of vertical frame members 10 connected at the lower ends by side and end frame rail members 11 and 12 respectively. Extending between the side rail members 11 is a series of transverse frame members 13 to reinforce the lower portion of the frame structure and stabilize the same. The upper ends of the vertical frame members 10 are similarly connected by a series of transversely extending frame bars 14, upon which is supported side frame bars 15 (Figure 3). The frame structure is of rectangular shape and the frame bars may be formed of structural members or wood, and in the case of the former all joints will be welded or held in place by suitable fastening elements (not shown).

Mounted at each end of the frame structure and on the end vertical frame members 10 is a pair of bearing brackets 16 having their bases fastened in place by suitable bolts or screws 17 so that the bearing opening of each pair of brackets are in horizontal alinement. Rotatably supported by one pair of bearing brackets 16 is a shaft 18 which has its ends journaled in the bearing openings of said brackets and similarly, a shaft 19 has its ends journaled in the bearing openings of the other pair of bearing brackets. Affixed to each of the rotatable shafts 18 and 19 adjacent their ends is a pair of sprocket wheels 20 and 21 respectively, over which is trained a pair of sprocket chains 23, one extending along each side of the upper portion of the rectangular supporting frame structure. The sprocket chains are of conventional design and include inner and outer links 24 and 25 respectively connected by transverse pivot pins 26.

Certain of the outer links 25 are provided with apertured projections 28 adjacent one end thereof and slotted projections 29 adjacent the other end (Figure 7).

Extending between and supported by the endless sprocket chains 23 is a series of dies or molds, each consisting of a pair of dies or mold sections 31 and 32. The die section 31 is formed at its ends with longitudinal extensions 33 which are received in the openings of transversely alined apertured projections 28. Similarly, the die section 32 is provided with longitudinally extending projections 34 of a slightly greater length than the extensions 33, and said extensions are received in the slots of transversely alined pairs of slotted projections 29. Thus, the die or mold sections 31 are fixed, while the die sections 32 are movable to and from the die sections 31. It is intended that a plurality of said dies or molds be provided and supported in spaced apart relation by the endless sprocket chains so that the molds or dies can be continuously filled and discharged when they reach a predetermined location along the conveyor pathway.

Each of the die or mold sections 31 and 32 is provided in its adjacent faces with complementary arcuate recesses 35 and 36 respectively so that when the die or mold sections are closed, the complementary arcuate recesses will form a die or mold cavity of a size and shape to receive a charge of confectionery material or composition.

In order to hold the die or mold sections in sliding relationship one with the other, the fixed die or mold sections 31 are provided with guide bolts 38 having a head 39, and said guide bolts extend through guideways 40 in the other die or mold section 32. Thus, the mold or die sections 32 can slide toward and away from the mold or die sections 31 to facilitate forming the confectionery composition and discharging the material after it has been formed.

A drive motor 41 is mounted on a suitable platform or support 42 extending between certain of the vertical frame members 10 so that the armature shaft 43 of said motor can be drivingly connected to a speed reduction unit 44 by means of a suitable coupling element 45. The speed reduction unit is provided with an output shaft 46 having a V-pulley 47 affixed thereto for receiving a V-drive belt 48. A similar V-pulley 49 is affixed to one end of the shaft 18, and said V-belt is trained thereover in driving relationship therewith. Hence, continuous motion is imparted to the endless sprocket chain 23 to cause the upper flight thereof to travel in a direction indicated by the arrows (Figure 1).

Also mounted on the sprocket shaft 19 is a drum 50 substantially the same diameter as the sprocket wheels 21, and over said drum is passed a flexible endless apron 51. The other end of the flexible apron 51 is supported on a drum or roller 52 mounted on a shaft 53, which has its ends journaled in adjustable bearing blocks 54. The adjustable bearing blocks 54 are mounted for longitudinal sliding movement in slots 55 formed in the upper side frame members 15. An adjusting screw 56 is threaded in a correspondingly threaded opening in a bracket 57, affixed to each of the upper side frame members 15 so that the ends of the adjusting screws will engage the adjustable bearing blocks and permit the block to be adjusted and thereby tighten or loosen the flexible endless apron 51. The flexible endless apron 51 is positioned beneath the die or mold members, and engages the underside thereof to form a bottom wall for the mold or die cavities thereof. Since the flexible endless apron 51 is trained over the drum 50 which is of substantially the same diameter as the sprocket wheels 21, the apron will move at the same speed as the mold or die members. It is to be noted, that the endless apron 51 does not extend the full length of the confectionery machine, so that the mold or die members will travel a portion of their distance with the bottom wall formed by said apron out of engagement. Thus, the cavities in the die members will be open at their lower ends for said portion of their endless travel.

Arranged adjacent the left hand end of the flexible apron 51 is a hopper 60, which is supported beneath the die or mold members and between the upper side frame members 15. A lateral discharge chute 61 is formed at one end of the hopper 60 for discharging the candy or confectionery into suitable containers.

In order to move the sectional die or mold members 32 away from the sectional die or mold members 31 to facilitate the discharge of the candy or confectionery as they approach the hopper 60, a pair of pivoted detents 63 are pivoted one to each upper side frame member 15 as at 64. The pivoted detents are yieldingly urged about their pivot pins 64 to assume an upright position by coil springs 65 which have one end arranged in engagement with a bracket 66 affixed to the upper side frame members 15, and their opposite ends in abutting relation with the pivoted detents 63. The pivoted detents 63 are positioned in the path of the longitudinal projections 34 of the die or mold sections 32 so as to engage said projections and cause the mold or die sections to separate while traveling about the hopper 60. Thus, the candy or confectionery will be discharged as the mold or die sections separate. When the compressional force of the coil springs 65 has been overcome, the pivoted detents 63 will rock about their pivot axis 64 and permit the projections 34 to slide thereover. The separated mold or die sections 31 and 32 travel along the lower flight of the endless conveyor or sprocket chains in an open position and are closed for refilling when they reach the opposite end of the confectionery machine.

The closing of the mold or die sections 31 and 32 is accomplished by means of a pair of endless friction belts 70 arranged one on each side of the confectionery machine, and said belts are supported on suitable spaced pulleys 71 mounted on transverse shafts 72 journaled in bearings carried by the upper side frame members 15. The left hand shaft 72 is located a slight distance beneath the horizontal level of the other shaft so that the endless friction belts will disengage the longitudinal projections 34 after they have frictionally engaged the same to move the mold or die sections into operative engagement. The friction belts 70 travel at a speed faster than the endless sprocket chains 23 so that the mold or die sections 32 will move toward the sections 31 as said mold or die sections travel above the endless friction belts 70.

In order to drive the friction belts 70 at a greater speed than the endless sprocket chains 23, a drive pulley 74 is affixed to the shaft 19 and said pulley accommodates a drive belt 75 which is trained over a pulley 76 secured to the end of one of the shafts 72. The pulley 76 is of decreased diameter such that the pulleys 71 will rotate at a much faster speed than the sprocket wheels 21. Thus, it will be seen that as the die or mold sections travel above the shafts 72, the endless belts 70 will frictionally engage the longitudinal projections 34 on the die or mold sections 32 and move said die or mold sections 32 toward the die or mold sections 31 by reason of the pin and slot connections 34 and 29, as well as the fact that the die or mold section 31 is traveling at a reduced speed.

In order to limit the swinging movement of the pivoted detents 63 in a reverse direction, stop pins 80 are mounted in the upper frame members 15 which engage the pivoted detents and limit clockwise movement, and at the same time maintain said pivoted detents in position in the path of the longitudinal projections 34 on the movable die or mold sections 32.

In operation, the motor 41 is energized from a suitable source of electrical energy to drive the shaft 18 through the medium of the reduction gearing unit 44, output shaft 46 and drive belt 48. The shaft 18 is rotated in a direction to cause the endless conveyor 23 to travel in the direction indicated by the arrow in Figure 1. While the conveyor is moving to carry the separable die or mold members in the direction of the arrow, they are filled with a confectionery composition at the right hand end of the machine manually by depositing the material in the mold or die members after they have been closed by the friction belts 70.

As the mold or die members continue their travel toward the left hand end of the machine the confectionery composition is cooled and solidified. When the mold or die members reach a position adjacent the hopper 60, they are separated by engagement of the extension 34 with the pivoted detent 63. After the mold or die members separate, the preformed confectionery material is free to be discharged into the hopper 60 and can be collected at one side of the machine by placing a receptacle beneath the chute 61.

It is to be understood, that the form of the invention herewith shown and described is to be taken as a preferred embodiment of the invention and that various changes in the shape, size and arrangement of parts can be resorted to without departing from the spirit of the invention or the scope of the subjoined claims.

I claim:

1. In a confectionery machine, a plurality of pairs of separable mold sections positioned with the mold sections of each pair spaced apart and mounted to move along a circuitous pathway, said mold sections being provided with recesses in their adjacent faces forming mold cavities, the trailing mold section of each pair having projections at the ends thereof, a flexible apron mounted beneath said mold sections to form a bottom wall for said mold cavities, a yieldingly mounted detent in the path of said mold sections positioned to engage the projections of the trailing mold section of each pair to move the same away from the other section of said pair as said sections reach a predetermined location along said pathway to facilitate discharge of the confectionery deposited in said mold cavities, means along said pathway spaced from said yieldingly mounted detent for moving said mold sections together prior to refilling.

2. In a confectionery machine, a plurality of pairs of separable mold sections positioned with the mold sections of each pair spaced apart and mounted to move along a circuitous pathway, each pair of said mold sections being provided in their adjacent faces with complementary recesses to form mold cavities, a flexible apron mounted beneath said mold sections forming a bottom wall for said mold cavities, the trailing mold section of each pair having projections on the ends thereof, a detent along said pathway engageable with the projections of said mold section of each pair to separate said section from the complementary section of the pair during their circuitous travel along said pathway, means along said pathway spaced from said detent for frictionally engaging one of each pair of said mold sections to move the sections together during their continued travel along said pathway, and means for moving said mold sections and apron at the same speed.

3. In a continuous confectionery making machine, an endless conveyor having spaced sprocket chains, a plurality of mold sections mounted on said conveyor in fixed relation thereto, a plurality of coacting mold sections slidably mounted in said chains, said mold sections being provided with a series of complementary recesses in their adjacent faces to form mold cavities, means adjacent said conveyor for engaging the slidably mounted mold sections to separate the same from the fixed mold sections and thereby facilitate discharge of the contents of the mold cavities, means also adjacent said conveyor for engaging the said coacting mold sections to close the same against the said fixed mold sections after discharge of the confection and means for driving said conveyor.

4. In a continuous confectionery making machine, a pair of endless sprocket chains arranged in spaced apart parallel relation to form a conveyor, a plurality of mold sections fixedly mounted between said endless sprocket chains, a plurality of movable mold sections mounted between said endless sprocket chains and arranged to cooperate with said first named mold sections so that recesses in their adjacent faces will form mold cavities, an endless apron mounted beneath said mold sections to form a bottom wall for said mold cavities during a portion of their travel about the endless conveyor pathway, a rockably mounted member yieldingly urged in a direction counter to the direction of travel of said conveyor for engaging said movable mold sections as they pass said detent and cause said cooperating mold sections to separate and discharge their contents, a driven movable member mounted adjacent said conveyor in spaced relation from said rockably mounted member for frictionally engaging said movable mold sections and causing the same to be moved into operative relation with said fixed mold section of each set, means for driving said conveyor chains and apron at the same speed and means for driving said driven movable members at a speed greater than the speed of said endless conveyor chains.

5. In a continuous confectionery making machine, a pair of endless sprocket chains arranged in spaced apart parallel relation to form a conveyor, a plurality of mold sections fixedly mounted between said endless sprocket chains, a plurality of movable mold sections mounted between said endless sprocket chains and arranged to cooperate with said first named mold sections so that recesses in their adjacent faces will form mold cavities, an endless apron mounted beneath said mold sections to form a bottom wall for said mold cavities during a portion of their travel about the endless conveyor pathway, a rockably mounted member yieldingly urged in a direction counter to the direction of travel of said conveyor for engaging said mold sections as they pass said detent and cause said cooperating mold sections to separate and discharge their contents, a driven movable member mounted adjacent said conveyor in spaced relation from said rockably mounted member for frictionally engaging said movable mold sections and causing the same to be moved into operative relation with said fixed mold section of each set, means for driving said conveyor chains and apron at the same speed, means for driving said driven movable members at a speed greater than the speed of said endless conveyor chains and a hopper located beneath said mold sections adjacent said rockably mounted member to collect the contents of said mold sections as they are discharged thereabove.

6. In a confection forming machine, the combination which comprises a supporting frame, sprockets journaled on the ends of the frame, a pair of chains positioned at the sides of the frame and trained over the said sprockets, pairs of molds including fixed and movable sections carried by the chains and positioned in spaced relation along the chains, the fixed section of each pair of molds being attached to the chains, the movable section of each pair of molds being slidably mounted in the chains, the sections of the said pairs of molds having registering recesses in the meeting surfaces thereof, an apron conveyor extended through part of the length of the frame with the upper surface thereof positioned to coact with the recesses of the mold sections to provide product retaining cavities, means actuating the movable mold sections away from the fixed mold sections as the molds pass beyond the end of the apron conveyor, and means returning the said movable mold sections to closed positions against the fixed mold sections.

WALTER A. SEBRING.

REFERENCES CITED

The following references are of record in the file of this patent:

UNITED STATES PATENTS

| Number | Name | Date |
|---|---|---|
| 1,348,081 | Brach | July 27, 1920 |
| 1,558,284 | Paley | Oct. 20, 1925 |
| 1,840,438 | Faure | Jan. 12, 1932 |
| 2,157,570 | Raynolds, Jr. | May 9, 1939 |
| 2,245,263 | Dostal | June 10, 1941 |
| 2,291,097 | Mooney | July 28, 1942 |
| 2,358,292 | Malhiot | Sept. 12, 1944 |